United States Patent
An et al.

(10) Patent No.: US 9,024,983 B2
(45) Date of Patent: May 5, 2015

(54) THREE-DIMENSIONAL IMAGE DISPLAY DEVICE AND DRIVING METHOD THEREOF

(75) Inventors: CheungHwan An, Seoul (KR); JoonHa Park, Goyang-si (KR); JaeWoo Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 99 days.

(21) Appl. No.: 13/614,410

(22) Filed: Sep. 13, 2012

(65) Prior Publication Data

US 2013/0155127 A1  Jun. 20, 2013

(30) Foreign Application Priority Data

Dec. 14, 2011  (KR) .......................... 10-2011-0134699

(51) Int. Cl.
*H04N 13/04*  (2006.01)
*H04N 13/00*  (2006.01)

(52) U.S. Cl.
CPC ........ *H04N 13/0404* (2013.01); *H04N 13/0029* (2013.01); *H04N 13/0413* (2013.01); *H04N 13/0497* (2013.01)

(58) Field of Classification Search
CPC .......... H04N 13/0438; H04N 13/0406; H04N 13/0409; H04N 13/0411; H04N 13/0413; H04N 13/0415; H04N 13/0418; H04N 13/042; H04N 13/0422; G09G 2310/06
USPC .................... 345/6, 32, 204; 348/51
See application file for complete search history.

(56) References Cited

U.S. PATENT DOCUMENTS

| | | | |
|---|---|---|---|
| 6,094,216 A * | 7/2000 | Taniguchi et al. | 348/51 |
| 2008/0259063 A1 * | 10/2008 | Kim et al. | 348/51 |
| 2009/0073557 A1 | 3/2009 | Ito | |
| 2011/0234773 A1 * | 9/2011 | Koh et al. | 348/56 |
| 2011/0292184 A1 * | 12/2011 | de Greef | 348/51 |

FOREIGN PATENT DOCUMENTS

| | | |
|---|---|---|
| CN | 101290758 A | 10/2008 |
| KR | 10-2010-0009739 A | 1/2010 |

* cited by examiner

*Primary Examiner* — Kevin M Nguyen
(74) *Attorney, Agent, or Firm* — Birch, Stewart, Kolasch & Birch, LLP

(57) ABSTRACT

A 3D image display device is provided. The 3D image display device includes a display panel, a filter, a filter driver and a timing controller. The filter is disposed at a front surface of the display panel and comprises a light transmitting area for transmitting an images and a light blocking area for blocking an images. The timing controller converts a received 3D image into a copied 3D image, outputs the copied 3D image through the display panel in units of a frame, and controls the filter driver for switching between a position of the light transmitting area and a position of the light blocking area in units of a frame.

6 Claims, 10 Drawing Sheets

THREE-DIMENSIONAL IMAGE DISPLAY DEVICE AND DRIVING METHOD THEREOF

CROSS-REFERENCE TO RELATED APPLICATIONS

This application claims the benefit of the Korean Patent Application No. 10-2011-0134699 filed on Dec. 14, 2011, which is hereby incorporated by reference as if fully set forth herein.

BACKGROUND

1. Field of the Invention

The present invention relates to a display device, and more particularly, to a Three-Dimensional (3D) image display device and a driving method thereof, which display an image three-dimensionally.

2. Discussion of the Related Art 3D image display devices three-dimensionally display an image by using characteristic where a sense of perspective is shown in combining different image signals discerned by two eyes.

The stereoscopic technique, the volumetric technique, and the holographic technique are known as methods of realizing a 3D image. Among these techniques, the stereoscopic technique is again categorized into a glasses technique and a glasses-free technique. Recently, the glasses-free technique is being actively researched.

A glasses-free 3D image display device outputs image data for 3D, and thus, a user can watch images for 3D even without wearing glasses. The glasses-free 3D image display device includes a parallax barrier or a lenticular lens (hereinafter referred to as a filter).

The following two methods are proposed as methods of generating image data for 3D.

A first method is a method in which two or more cameras capture images, generate two images respectively corresponding to a left-eye image and a right-eye image, and renders the images to generate a image data for 3D.

A second method is a method that analyses and processes Two-Dimensional (2D) image captured in a point of view (for example, a point of one camera), generates two 2D images respectively corresponding to a left-eye image and a right-eye image, and renders the images to generate a image data for 3D.

In all the above-described methods, an image that is outputted by a panel during one frame includes a left-eye image and a right-eye image.

FIG. 1 is an exemplary diagram illustrating a configuration of a panel of a related art glasses-free 3D image display device using a fixed-filter type, and illustrates a panel including a total of twelve pixels that are arranged in a 6×2 matrix type.

Particularly, FIG. 1 illustrates a structure of a panel for displaying images in which a circle (X) moves from a position of a portion (a) of FIG. 1 to a position of a portion (a) of FIG. 1. In the panel, a driving frequency is assumed as being 60 Hz. The fixed-filter type denotes a type that does not change a shape and a position of a parallax barrier or a lenticular lens.

In the fixed-filter type, as shown in the portion (a) of FIG. 1, a first received 3D image configured with a left-eye image (L) and a right-eye image (R) is outputted during an odd-numbered frame. Therefore, when the first received 3D image that is an odd-numbered image is outputted, as shown in the portion (a) of FIG. 1, a user discerns red (oL1(R)) in a first pixel area, blue (oL1(B)) in the first pixel area, and green (oL2(G)) in a second pixel area with a left eye, and also, discerns green (oR1(G)) in the first pixel area, red (oR2(R)) in the second pixel area, and blue (oR2(B)) in the second pixel area with a right eye. Here, the reds, blues and greens configure the first received 3D image.

In the same manner, when a second receive 3D image that is an even-numbered image is outputted, as shown in the portion (b) of FIG. 1, a user discerns red (eL1(R)) in the first pixel area, blue (eL1(B)) in the first pixel area and the green (eL2(G)) in the second pixel area with a left eye, and also, discerns green (eR1(G)) in the first pixel area, red (eR2(R)) in the second-pixel area and the blue (eR2(B)) in the second pixel area with a right eye. Here, the reds, blues and greens configure the second received 3D image.

In this case, the user cannot discerns green (oR1(G), eR1(G)) in the first pixel area, red (oR2(R), eR2(R)) in the second pixel area and blue (oR2(B), eR2(B)) in the second pixel area with a left eye, and also, cannot discern red (oL1(R), eL1(R)) in the first pixel area, blue (oL1(B), eL1(B)) in the first-pixel area and green (oL2(G), eL2(G)) in the second-pixel area with a right eye.

That is, in the above-described fixed-filter type, color information is lost.

Moreover, in the above-described fixed-filter type, a left eye discerns only a portion of the circle (X or Y), and also, a right eye discerns only a portion of the circle. That is, in the above-described fixed-filter type, spatial resolution is lost.

Figure 3:
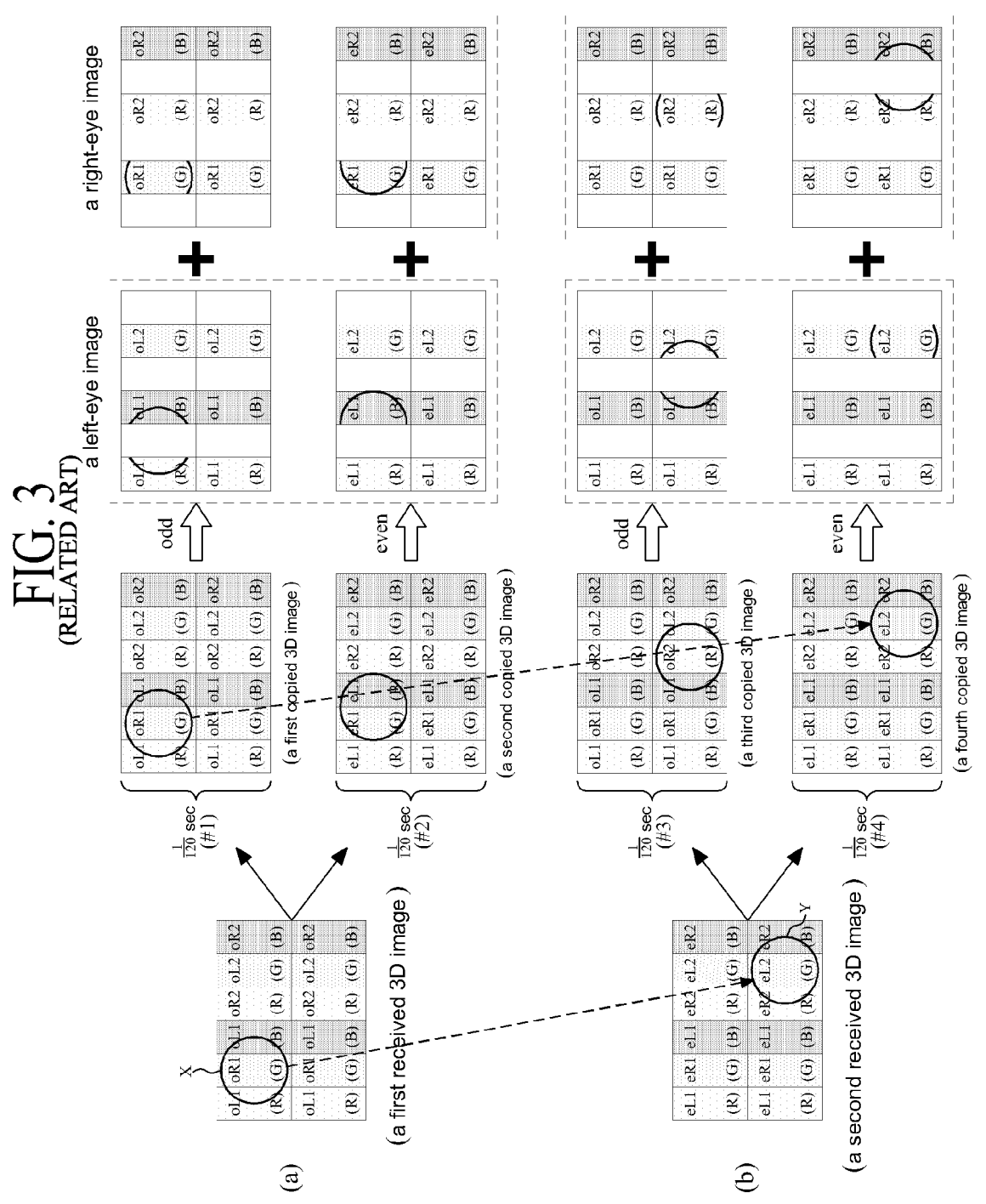

FIG. 2 and FIG. 3 are an exemplary diagram illustrating a configuration of a panel of a related art glasses-free 3D image display device using a time-sequential type, and illustrate a panel including a total of twelve pixels that are arranged in a 6×2 matrix type.

Particularly, FIG. 2 and FIG. 3 illustrate a structure of a panel for displaying images in which a circle (X) moves from a position of a portion (a) of FIG. 2 and FIG. 3 to a position of a portion (b) of FIG. 2 and FIG. 3. In the panel, a driving frequency is assumed as being 120 Hz. The time-sequential type denotes a type that breaks up time to enhance resolution.

Among the above-described types, the type of FIG. 2 is a type that copies one received 3D image (the first received 3D image or the second received 3D image), and sequentially outputs images through two frames, and for example, outputs each of a first copied 3D image (#1), a second copied 3D image (#2), a third copied 3D image and a fourth copied 3D image for 1/120 sec. Moreover, the type of FIG. 3 is a type that performs a motion compensation for one received 3D image (the first received 3D image or the second received 3D image), and sequentially outputs images through two frames, and for example, outputs each of the first copied 3D image (#1), the second copied 3D image (#2), the third copied 3D image and the fourth copied 3D image for 1/120 sec.

In FIG. 1, one received 3D image is outputted for 1/60 sec, but in FIGS. 2 and 3, one received 3D image is copied as two copied 3D images, or two copied 3D images are generated by compensating for the one received 3D image, and then each of the two copied 3D images is outputted for 1/120 sec. The time sequential type of FIGS. 2 and 3 outputs two copied 3D image for the same time (1/60 sec) as that of the fixed filter type, thus compensating for temporal resolution.

However, similarly to the fixed-filter type, in the related art time sequential type, as shown in FIG. 2 and FIG. 3, left and right eyes cannot discern some of colors, causing the loss of color information. Also, left and right eyes discern only a portion of an image (circle X or Y), causing the loss of spatial resolution.

SUMMARY

Accordingly, the present invention is directed to provide a 3D image display device and a driving method thereof that substantially obviates one or more problems due to limitations and disadvantages of the related art.

An aspect of the present invention is directed to provide a 3D image display device and a driving method thereof, which convert one received 3D image into at least one copied 3D image, output the copied 3D image through a display panel in units of a frame, and switch between a position of a light transmitting area and a position of a blocking area in a filter disposed at a front surface of the display panel in units of a frame.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a three-dimensional (3D) image display device including: a display panel outputting at least one image by using at least one copied 3D image; a filter disposed at a front surface of the display panel, and comprising a light transmitting area for transmitting the images and a light blocking area for blocking the images; a filter driver switching between a position of the light transmitting area and a position of the light blocking area; and a timing controller converting a received 3D image into the copied 3D image, outputting the copied 3D image through the display panel in units of a frame, and controlling the filter driver for switching between the position of the light transmitting area and the position of the light blocking area in units of a frame.

To achieve these and other advantages and in accordance with the purpose of the invention, as embodied and broadly described herein, there is provided driving method of a three-dimensional (3D) image display device, the driving method including: converting a received 3D image into at least one copied 3D image; and outputting the copied 3D image through a display panel in units of a frame, and switching between a position of the light transmitting area and a position of the light blocking area in units of a frame, the light transmitting area and the light blocking area being formed in a filter disposed at a front surface of the display panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 2 and 3 are exemplary diagrams illustrating a configuration of a panel of a related art glasses-free 3D image display device using a time-sequential type;

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

Figure 4:
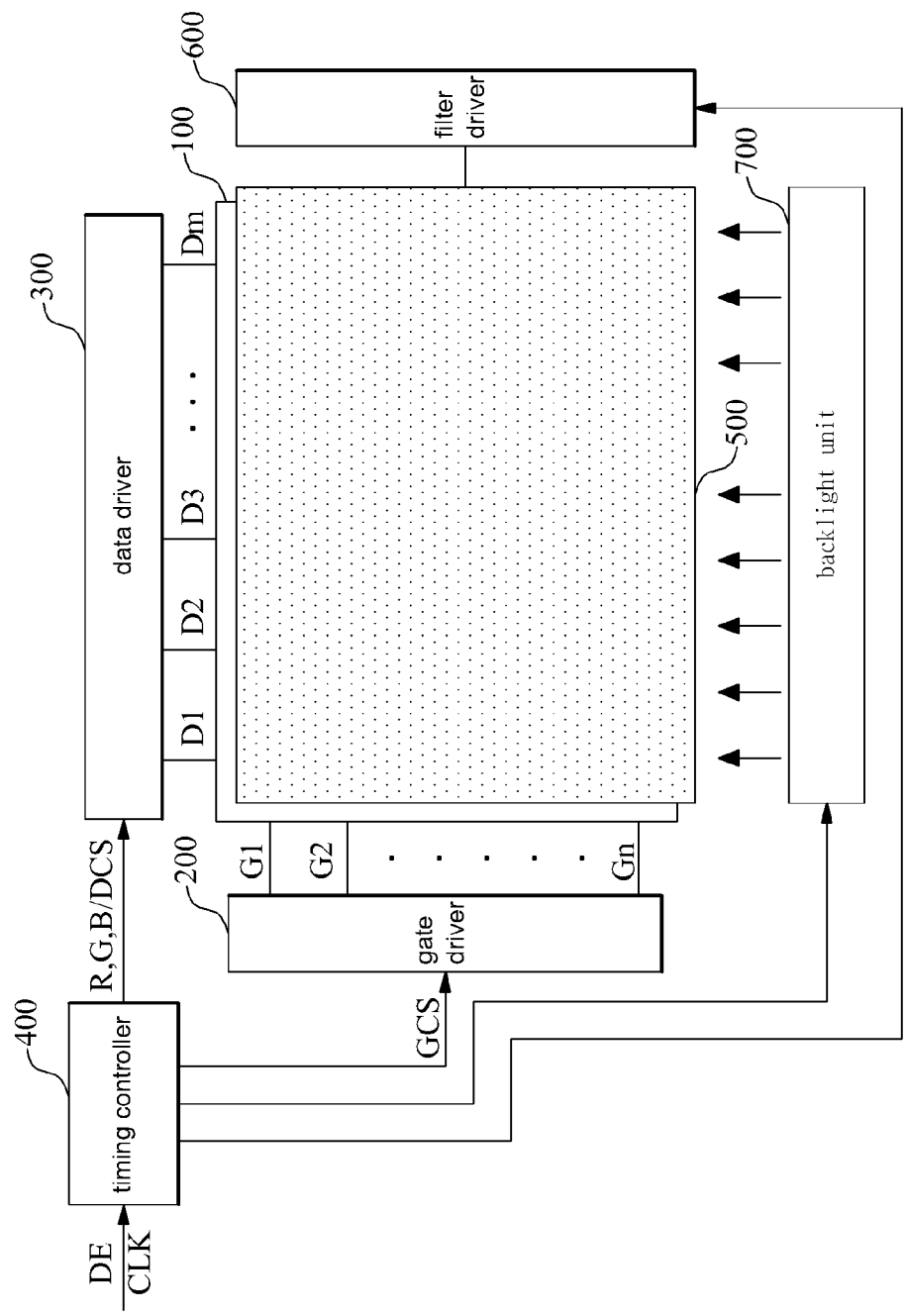
FIG. 4 is an exemplary diagram illustrating a configuration of a 3D image display device according to an embodiment of a present invention.
Figure 5:
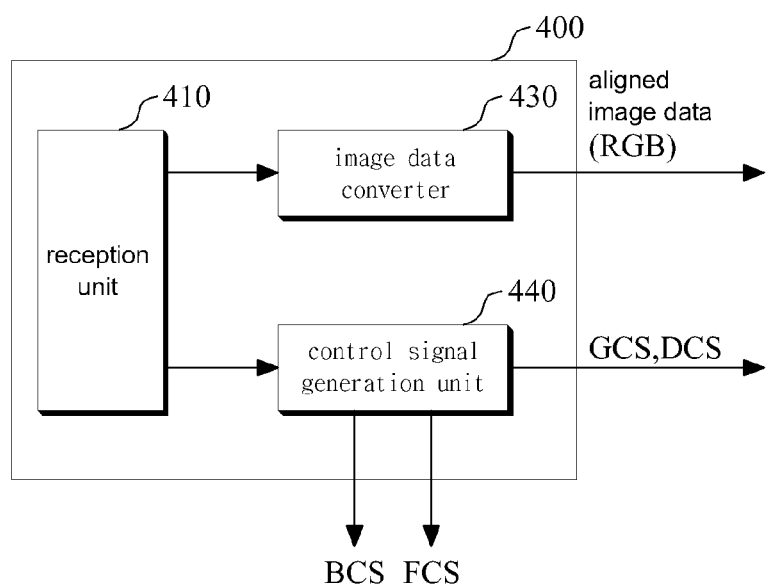
FIG. 5 is an exemplary diagram illustrating a configuration of a timing controller in the 3D image display device according to an embodiment of the present invention.

FIG. 4 is an exemplary diagram illustrating a configuration of a 3D image display device according to an embodiment of a present invention. FIG. 5 is an exemplary diagram illustrating a configuration of a timing controller in the 3D image display device according to an embodiment of the present invention.

The 3D image display device according to the present invention outputs an image without the loss of color information and the decrease in spatial resolution and temporal resolution. For this end, the present invention, as shown in FIG. 4, includes a display panel 100 that outputs at least one image by using at least one copied 3D image, a filter 500 that is disposed at a front of the display panel 100 and includes a light transmitting area and a light blocking area for transmitting or blocking the image, a filter driver 600 that switches between a position of the light transmitting area and a position of the light blocking area, a backlight unit 700 that irradiates light onto the display panel 100, a timing controller 400 that converts a received 3D image into the copied 3D image and controls the backlight unit 700 and the filter driver 600, a gate driver 200 that applies a scan pulse to a plurality of gate lines formed in the display panel 100 and a data driver 300 that applies a image data signal to a plurality of data lines formed in the display panel 100.

First, the display panel 100 may be configured in various types depending on the type of a display device. For example, the display panel may be a liquid crystal display panel, a plasma display panel, an organic light emitting display panel, or an electrophoresis display panel. Hereinafter, for convenience of a description, the liquid crystal display panel will be described as an example of the display panel 100. Therefore, a backlight unit 700 is required.

A plurality of pixels for displaying red, green, and blue (RGB) are formed in the display panel 100. The pixels are divided into a plurality of left-eye pixels that output a left-eye image and a plurality of right-eye pixels that output a right-eye image, for outputting images with the filter 500.

Next, the timing controller 400 receives a timing signal (including a data enable signal DE, a dot clock CLK, etc.) to generate a plurality of control signals DCS and GCS for respectively controlling an operation timings of the data driver 300 and the gate driver 200.

Particularly, the timing controller 400 applied to the present invention, as shown in FIG. 5, includes a reception unit 410, an image data converter 430 and a control signal generation unit 440.

Here, the reception unit 410 receives a received 3D image and a timing signal to transfer the timing signal to the control signal generation unit 440 and transfer the received 3D image to the image data converter 430.

The image data converter 430 converts the received 3D image into at least one copied 3D image, realigns image data configuring each of the copied 3D image to be suitable for the characteristic of the display pane 100, and transfers the aligned image data to the data driver 300.

For example, when a received 3D image, which uses two views and is driven at an input driving frequency of 60 Hz, is transferred to the timing controller 400 and an output driving frequency at which the display panel is driven is 120 Hz, the image data converter 430 converts the received 3D image into two copied 3D image. Here, the two copied 3D image, as described above with reference to FIG. 2, may have the same image. Also, as described above with reference to FIG. 3, one of the two copied 3D images may be equal to the received 3D image and the other of the two copied 3D images may be a motion-compensated 3D image generated by motion-compensating for the received 3D image. The first method, in which the two copied 3D images have the same image, will be described below in detail with reference to FIG. 8 and the second method, in which the two copied 3D images have different images, will be described below in detail with reference to FIG. 9.

As another example, when a received 3D image, which uses three views and is driven at an input driving frequency of 60 Hz is transferred to the timing controller 400 and an output driving frequency at which the display panel is driven is 180 Hz, the image data converter 430 converts the received 3D image into three copied 3D image. Here, the three copied 3D images may have the same images or have different images.

In this way, the image data converter 430 may generate at least one copied 3D image in consideration of the number of views of the received 3D image, an input driving frequency, an output driving frequency, etc. Here, the output driving frequency is a multiple of an input driving frequency, which is equal to the number of copied 3D images.

Therefore, when the received 3D image is driven at an input driving frequency of 120 Hz and an output driving frequency is 120 Hz, the image data converter 430 may not convert the received image. In this case, the received 3D image becomes the copied 3D image, and therefore the number of the received 3D image is equal to the number of the copied 3D image. That is, when an input driving frequency, at which the received 3D image is driven, is low such as 60 Hz, the present invention converts the received 3D image into the two copied 3D images and drives the copied 3D images at an output driving frequency of 120 Hz. However, when an input driving frequency, at which the received 3D image is driven, is high enough such as 120 Hz, the present invention may make the received 3D image become the copied 3D image and may make an output driving frequency, at which the copied 3D images driven, equal to an input driving frequency, at which the received 3D image is driven. However, for convenience of a description and for a clear description, a 3D image display device receiving a received 3D image, which is driven at an input driving frequency of 60 Hz, to convert the received 3D image into two copied 3D images, which is driven at an output driving frequency of 120 Hz, will be described as an example blow.

The control signal generation unit 440 generates a plurality of control signals DCS and GCS for respectively controlling the operational timing of the data driver 300 and the gate driver 200 by using a timing signal transferred from the reception unit 410.

Furthermore, the control signal generation unit 440 generates a backlight unit control signal BCS for controlling the scanning of a backlight unit 700 and generates a filter driver control signal FCS for controlling the filter driver 600.

Next, the data driver 300 includes a plurality of data drive Integrated Circuits (ICs), and latches a plurality of digital image data RGB according to the control of the timing controller 400. Furthermore, by converting the digital image data RGB into a plurality of analog positive/negative gamma compensation voltages, the data driver 300 generates a plurality of analog positive/negative pixel voltages and respectively supplies the pixel voltages to a plurality of data lines D1 to Dm. Here, a plurality of the digital image data RGB denotes a plurality of image data configuring each of the copied 3D images into which the timing controller 400 converts a received 3D image.

Next, the gate driver 200 includes one or more gate drive ICs, and sequentially supplies a scan pulse (gate pulse) to a plurality of gate lines G1 to Gn.

Next, the filter 500 includes the light transmitting area and the light blocking area for transmitting or blocking a left-eye image outputted from a left-eye pixel and a right-eye image outputted from a right-eye pixel. The filter 500 switches between a position of the light transmitting area and a position of the light blocking area in accordance with the application order of voltages from the filter driver 600 or the levels of the voltages, thereby alternately transferring images outputted from different positions in the filter 500 to one of a left eye and a right eye of a viewer.

The filter 500 may be variously configured by using a liquid crystal electric field lens disclosed in Korean Patent Application No. 10-2008-0070497 and technologies that have been known to those skilled in the art. The filter 500, for example, may be configured with the liquid crystal electric field lens or the like, and configured with a switchable liquid crystal lens or a switchable barrier where a light transmitting direction varies in accordance with a voltage application method.

A switchable type of a filter that has been known to those skilled in the art may also be applied to the present invention. The feature of the present invention is not limited to the configuration itself of the filter 500, and thus, a detailed description on the filter 500 is not provided.

Next, the filter driver 600, as described above, drives the filter 500 to switch between a position of the light transmitting area and a position of the light blocking area that are formed in the filter 500. The filter driver 600 may be configured by using technologies that have been known to those skilled in the art.

That is, the filter driver 600 may switch between a position of the light transmitting area and a position of the light blocking area in the filter 500 configured with one of the switchable barrier, a switchable liquid crystal lens or the like.

Therefore, the same pixel may output a left-eye image transferred to a left eye during a first frame, or output a right-eye image transferred to a right eye during a second frame.

Finally, the backlight unit 700 includes a light source LED and a light source driver driving the light source. The light source driver may sequentially drive the light source in accordance with the backlight unit control signal BCS transferred from the timing controller 400.

Figure 6:
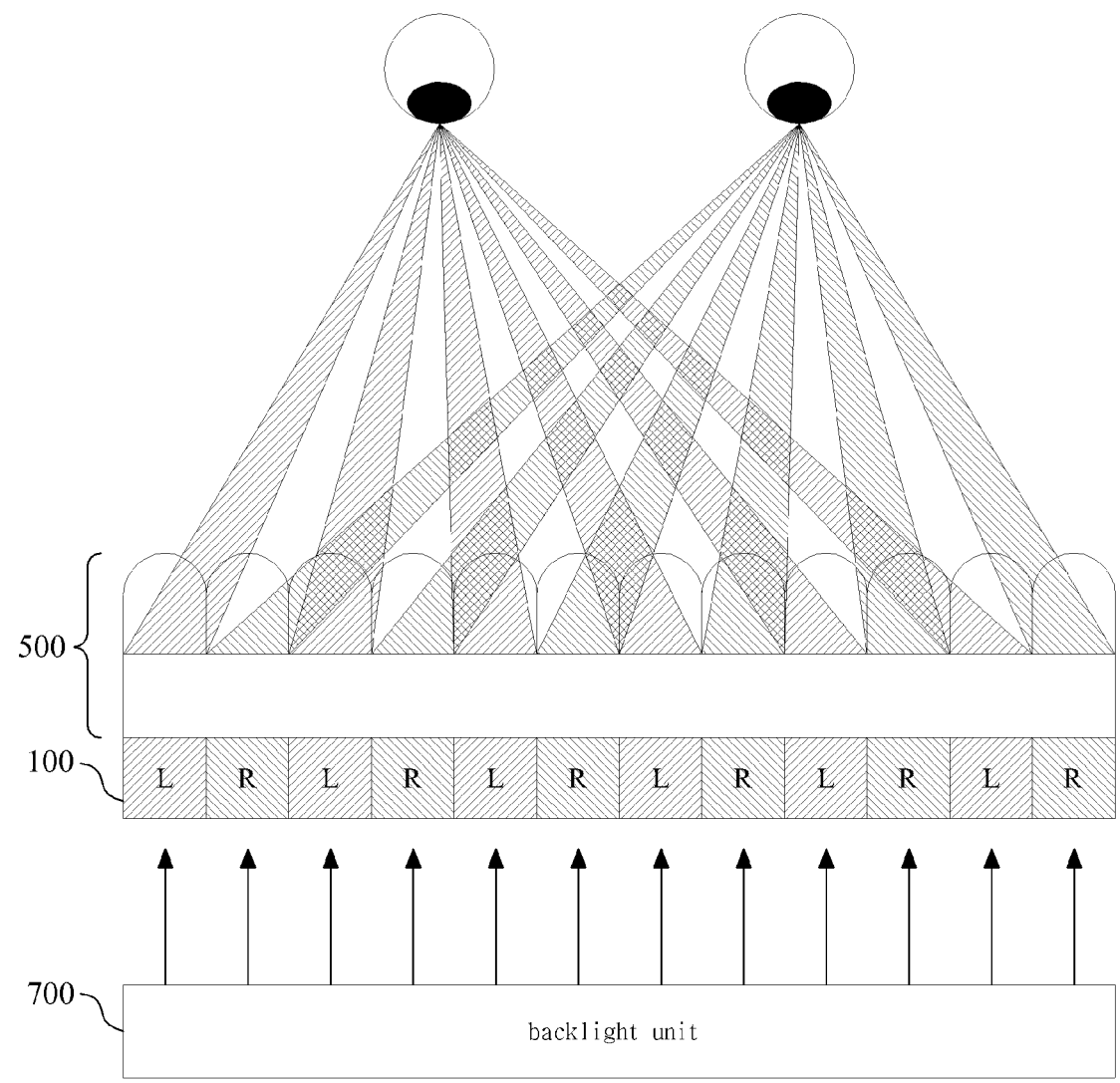
FIGS. 6 and 7 are exemplary diagrams for describing a basic configuration and driving method of the 3D image display device according to an embodiment of the present invention.
Figure 7:
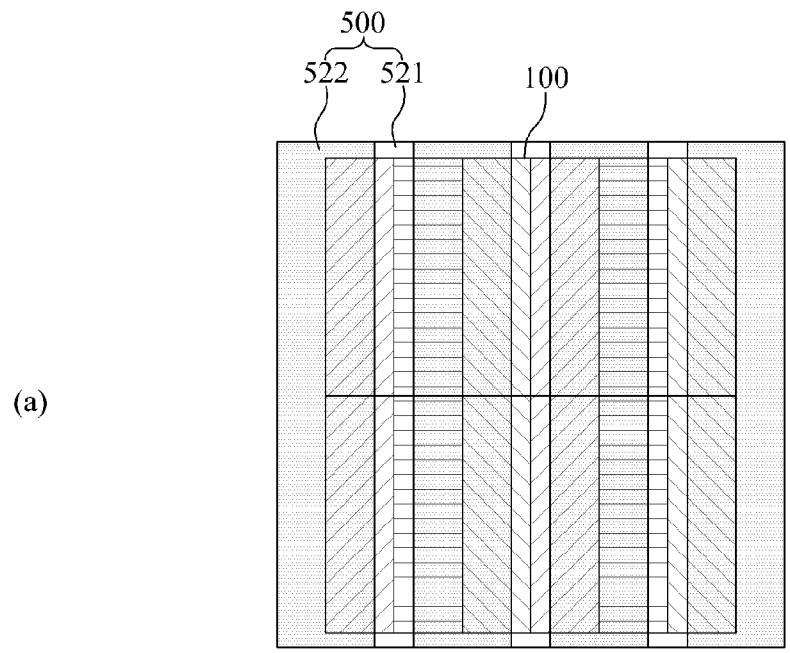
Figure 7:
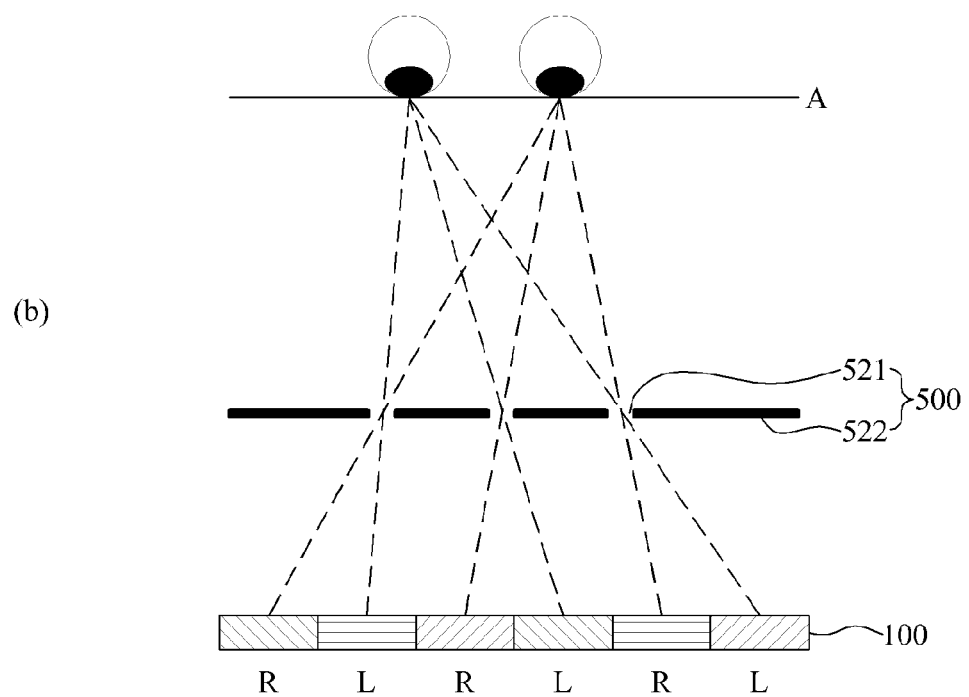

FIGS. 6 and 7 are exemplary diagrams for describing a basic configuration and driving method of the 3D image display device according to an embodiment of the present invention, and more particularly, FIG. 6 illustrates a driving method of the present invention using a lenticular lens as the filter 500 and FIG. 7 illustrates a driving method of the present invention using a parallax barrier as the filter 500. That is, in the present invention, a lenticular lens or a parallax barrier may be used as the filter 500, and more particularly, the filter 500 may be configured with a switchable filter in which a position of a light transmitting area and a position of a light blocking area may vary.

As shown in FIG. 6, in a glasses-free 3D image display device configured with a switchable lenticular lens, the lenticular lens divides a left-eye image and a right-eye image by using a refractive index. The refractive index of the lenticular lens may be changed in accordance with a control of the filter driver 600, and a position of a light transmitting area and a position of a light blocking area may be changed in accordance with a change of the refractive index of the lenticular lens. Therefore, a position of a pixel outputting a left-eye image and a position of a pixel outputting a right-eye image may be changed.

As shown in FIG. 7, in a glasses-free 3D image display device configured with a switchable parallax barrier, the parallax barrier is configured with barrier 522 and slit 521, and the parallax barrier divides a left-eye image and a right-eye image in accordance with a position of the slit 521. A position of a slit 521 of a parallax barrier may be changed in accordance with a control of the filter driver 600. Therefore, a position of a pixel outputting a left-eye image and a position of a pixel outputting a right-eye image may be changed.

Hereinafter, a driving method of the 3D image display device according to the present invention will be described in detail with reference to FIGS. 8 and 9.

Figure 8:
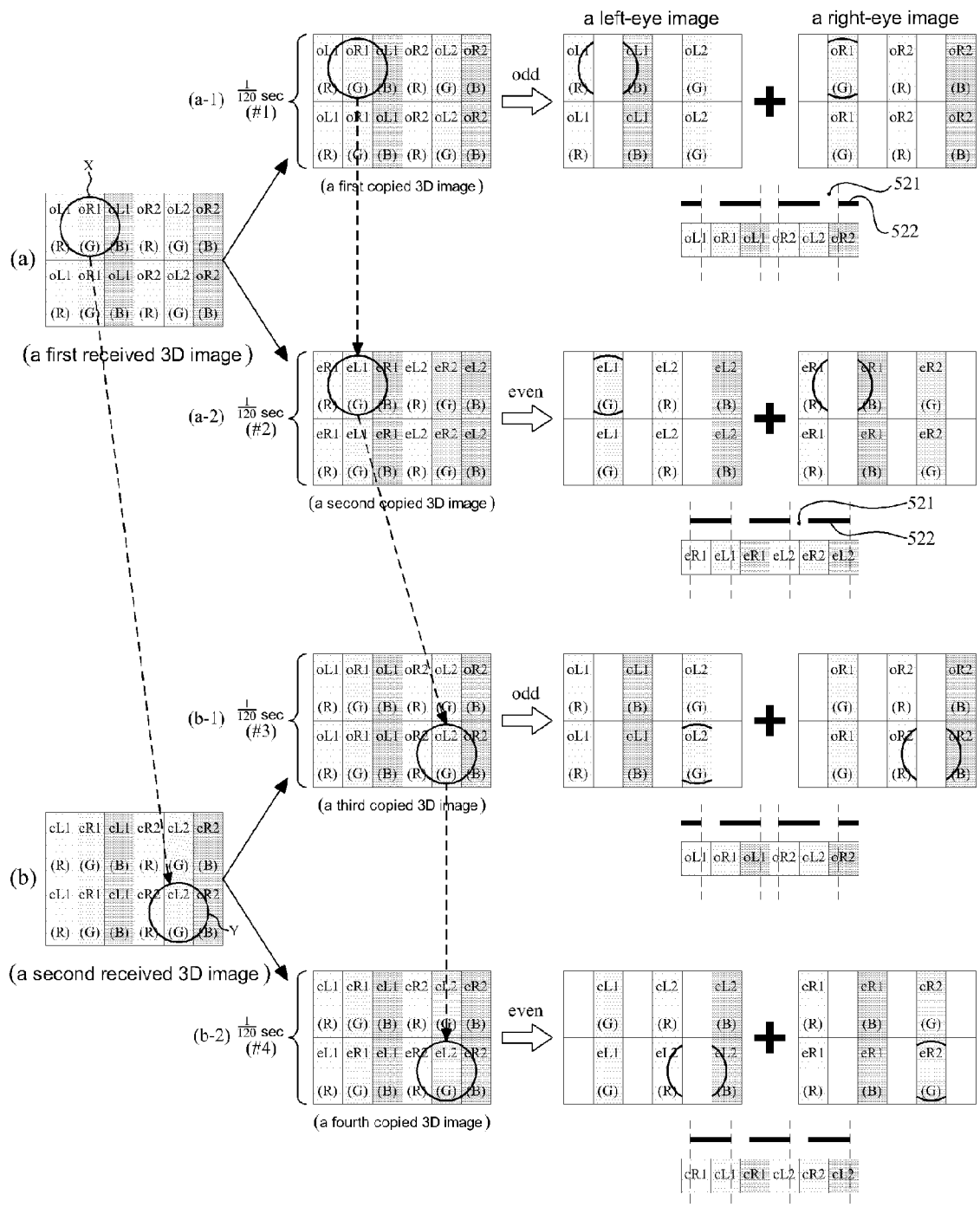
FIG. 8 is an exemplary diagram illustrating a configuration of a display panel in the 3D image display device using the same copied 3D images according to the present invention.

FIG. 8 is an exemplary diagram illustrating a configuration of a display panel in the 3D image display device using the same copied 3D images according to the present invention, and illustrates a panel including a total of twelve pixels that are arranged in a 6×2 matrix type. Also, FIG. 9 is an exemplary diagram illustrating a configuration of a display panel in the 3D image display device using different copied 3D images according to the present invention and, similarly to FIG. 8, illustrates a panel including a total of twelve pixels that are arranged in a 6×2 matrix type.

In the 3D image display device according to the present invention, the number of views configuring a received 3D image may be two or more. However, the following description will be made on an example where the number of views configuring the received 3D image is two, an input driving frequency at which the received 3D image is driven is 60 Hz and an output driving frequency at which a data driver is driven is 120 Hz. That is, in the following description, two copied 3D images may be generated by using one received 3D image, which includes two views and is driven at an input driving frequency of 60 Hz, and may be outputted through a display panel driven at an output driving frequency of 120 Hz.

However, as described above, if a received 3D image is configured with tree views and the received 3D image is driven at an input driving frequency of 60 Hz, three copied 3D images may be generated by using the received 3D image to be outputted through a display panel driven at an output driving frequency of 180 Hz. To provide an additional description, the present invention may generate a copied 3D image by using a received 3D image, and the number of received 3D images is selected by considering the number of views of the received 3D image, an input driving frequency, an output driving frequency or the like. Therefore, as described above, a received 3D image may become a received 3D image and the copied 3D image may be outputted by using an output driving frequency equal to an input driving frequency.

First, definitions of terms described below will be provided.

A first received 3D image denotes a received 3D image that shown in a portion (a) of FIG. 8. In the first received 3D image, there is an image of circle X. The second received 3D image denotes a received 3D image that is shown in a portion (b) of FIG. 8. In the second received 3D image, there is an image of circle Y. Hereinafter, the present invention will be described below with reference to the circle transferred from a position of a first pixel area of a first horizontal line to a position of a second pixel area of a second horizontal line.

A first pixel area includes areas of three pixels that are located in a left side in each of the horizontal lines. That is, in FIG. 8, a display panel consists of twelve pixels and three pixels RGB configure one pixel area. Therefore, a panel shown in FIG. 8 has four pixel areas. Among these pixel areas, three pixels located in the left side form a first pixel area and three pixels located in the right side form a second pixel area in each of the horizontal lines. Accordingly, a circle X in a portion (a) of FIG. 8 is formed in a firs pixel area of a first horizontal line and a circle Y in a portion (b) of FIG. 8 is formed in a second pixel area of a second horizontal line.

oL1 denotes a pixel that outputs a left-eye image among the pixels configuring a first pixel area of an odd frame. oL2 denotes a pixel that outputs a left-eye image among pixels configuring a second pixel area of an odd frame. oR1 denotes a pixel that outputs a right-eye image among pixels configuring a firs pixel area of an odd frame. oR2 denotes a pixel that outputs a right-eye image among pixels configuring a second pixel area of an odd frame. In the same manner, eL1 denotes a pixel that outputs a left-eye image among pixels configuring a first pixel area of an even frame. eL2 denotes a pixel that outputs a left-eye image among pixels configuring a second pixel area of an even frame. eR1 denotes a pixel that outputs a right-eye image among pixels configuring a firs pixel area of an even frame. oR2 denotes a pixel that outputs a right-eye image among pixels configuring a second pixel area of an even frame.

Next, a description on FIG. 8 will be made as follows. Here, a driving method of a 3D image display device according to the present invention will be described with reference to FIG. 8 as an example. A first received 3D image in the portion (a) of FIG. 8 is changed to a second received 3D image in the portion (b) of FIG. 8.

A first received 3D image and a second received 3D image are driven at an input driving frequency of, for example 60 Hz, and are determined to be outputted during a frame corresponding to 1/60 sec through a display panel. A circle X is formed in a first pixel area of a first horizontal line of a first received 3D image and a circle Y is formed in a second pixel area of a second horizontal line of a second received 3D image. That is, after a first received 3D image is outputted during a first frame through a display panel, a second received 3D image is outputted during a second frame through the display panel, thereby images, in which a circle is transferred from a position X to a position Y, being displayed. These received 3D images are inputted to a timing controller 400 to be changed to two copied 3D image as described below.

First, if a first received 3D image is transferred to a reception unit 410 in a timing controller, an image data converter 430 generates a firs copied 3D image (#1) and a second copied 3D image (#2) by using a first received 3D image. Here, the first copied 3D image and the second copied 3D image have the same images. That is, a plurality of image data configuring the first copied 3D image and a plurality of image data configuring the second copied 3D image are the same.

In the same manner, if a second received 3D image is transferred to a reception unit 410 in a timing controller, an image data converter 430 generates a third copied 3D image and a fourth copied 3D image by using a second received 3D image. Here, the third copied 3D image and the fourth copied 3D image are the same.

Second, the first copied 3D image (#1) is outputted during a first frame. The first copied 3D image (#1), as shown in a portion (a-1) of FIG. 8, is equal to the first received 3D image. Also, the first copied 3D image is driven at an output driving frequency of 120 Hz which is two times faster than that of the first received 3D image, and therefore, the first copied 3D image is outputted for $\frac{1}{120}$ sec. A right-eye image in the first copied 3D image is transferred to a right eye of a user and a left-eye image in the first copied 3D image is transferred to a left eye of the user.

At this point, each of a right-eye images and a left-eye images are transferred to a right eye or a left eye through a slit (or lens) 521 formed in a filter 500 shown in a portion (a-1) of FIG. 8. That is, images outputted from oL1(R), oL1(B) and oL2(G) are transferred to a left eye through the slit 521 formed in a filter 500, and images outputted from oR1(G), oR2(R) and oR2(B) are transferred to a right eye through the slit 521 formed in a filter 500.

Third, the second copied 3D image (#2) is outputted during a second frame. After a first copied 3D image is outputted, a second copied 3D image (#2) is outputted for $\frac{1}{120}$ sec (during a second frame). At this time, a timing controller 400 transfers a filter driver control signal FCS to a filter driver 600 for a position of a slit 521 to be changed. By this change, a pixel outputting a right-eye image transferred to a right eye during a first frame outputs a left-eye image transferred to a left eye during a second frame.

For example, as shown in a portion (a-1) of FIG. 8, if images outputted from a first pixel, a third pixel and a fifth pixel from the left side of a first horizontal line and a second horizontal line are transferred to a left eye, and images outputted from a second pixel, a fourth pixel and a sixth pixel from the left side of a first horizontal line and a second horizontal line are transferred to a right eye during a first frame, a timing controller controls a filter driver 600 for transferring images outputted from a second pixel, a fourth pixel and a sixth pixel from the left side of a first horizontal line and a second horizontal line to a left eye, and transferring images outputted from a first pixel, a third pixel and a fifth pixel from the left side of a first horizontal line and a second horizontal line to a right eye during a second frame as shown in a portion (a-2) of FIG. 8.

Accordingly, left-eye pixels (oL1(R), oL1(B), oL2(G)) outputting images transferred to a left eye during a first frame are changed to right-eye pixels (eR1(R), eR1(B), eR2(G)) outputting images transferred to a right eye during a second frame. Here, the change does not means a physical change of pixels but means a functional change of pixels. That is, the change means a change that a pixel outputting an image transferred to a left eye is changed to a pixel outputting an image transferred to a right eye and a pixel outputting an image transferred to a right eye is changed to a pixel outputting an image transferred to a left eye.

To provide an additional description, as described above, image data, which configure a first copied 3D image and are outputted through pixels, and image data, which configure a second copied 3D image and are outputted through pixels, are the same. Therefore, image data, which are transferred to pixels when a first copied 3D image is outputted, and image data, which are transferred to pixels when a second copied 3D image is outputted, are the same. However, image data, which configures a first copied 3D image and is outputted through a pixel to be transferred to a left eye, is transferred to a right eye in a second copied 3D image.

Due to the above-described driving method, every colors and every image are transferred to a left eye of a user, and every colors and every image are transferred to a right eye of a user, too. That is, if one left-eye image shown in the portion (a-1) of FIG. 8 and the other left-eye image shown in the portion (a-2) of FIG. 8 are overlapped, every colors RGB is displayed and a circle equal to a circle formed in a first receive 3D image is perfectly displayed. Therefore, according to the present invention, every colors may be completely transferred to each of a left eye and a right eye (full color), image forming a complete shape may be transferred to each of a left eye and a right eye (spatial resolution compensation) and because two frame is outputted for $\frac{1}{60}$ sec equal to a time for which a first received 3D image is outputted, temporal resolution may be increased.

In a portion (b) of FIG. 8, by using a same method described above with reference to a portion (a) of FIG. 8, a second received 3D image is changed to a third copied 3D image (#3) and a fourth copied 3D image (#4), and the third copied 3D image is outputted during a third frame and the fourth copied 3D image is outputted during a fourth frame. Here, except that a position of a circle in a second received 3D image differs from a position of a circle in a first received 3D image, every processes described above with reference to a portion (a) of FIG. 8 may be applied equally. Here, the circle of the first received 3D image is formed in a first pixel area of a first horizontal line, but the circle of the second received 3D image is formed in a second pixel area of a second horizontal line.

FIG. 8 is for visually and clearly showing the present invention by a first received 3D image and a second received 3D image when a position of a circle formed in a first received 3D image is being changed, and thus, a detailed description on the portion (b) of FIG. 8 is not provided.

Next, a description on FIG. 9 will be made as follows. Here, a driving method of a 3D image display device according to the present invention will be described with reference to FIG. 9 as an example. A first received 3D image in the portion (a) of FIG. 9 is changed to a second received 3D image in the portion (b) of FIG. 9.

For example, a first received 3D image and a second received 3D image are driven at an input driving frequency of 60 Hz, and are determined to be outputted during a frame corresponding to $\frac{1}{60}$ sec through a display panel. A circle X is formed in a first pixel area of a first horizontal line of a first received 3D image and a circle Y is formed in a second pixel area of a second horizontal line of a second received 3D image. That is, after a first received 3D image is outputted during a first frame through a display panel, a second received 3D image is outputted during a second frame through the display panel, thereby images, in which a circle is transferred from a position X to a position Y, being displayed. These received 3D images are inputted to a timing controller 400 to be changed to two copied 3D image as described below.

Figure 9:
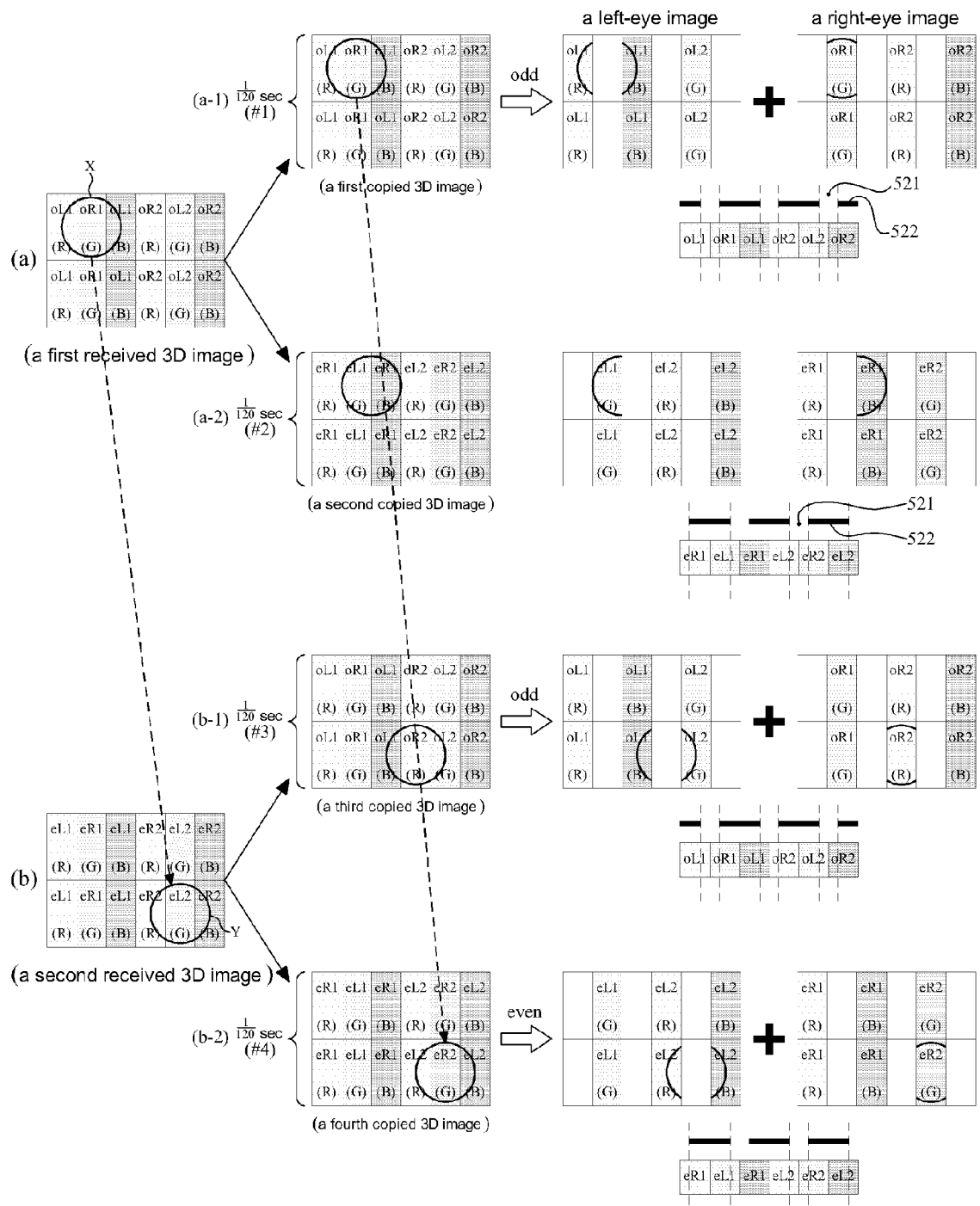
FIG. 9 is an exemplary diagram illustrating a configuration of a display panel in the 3D image display device using different copied 3D images according to the present invention.

Particularly, the embodiment of FIG. 8 and the embodiment of FIG. 9 have a difference in that copied 3D images generated with one received 3D image (first received 3D image or second received 3D image) differ.

On the other hand, the embodiment of FIG. 8 and the embodiment of FIG. 9 have the same feature in that a first received 3D image transferred to a timing controller 400 is changed to a first copied 3D image and a second copied 3D image, and a second received 3D image transferred to a timing controller 400 is changed to a third copied 3D image and a fourth copied 3D image.

In FIG. 8, a first received 3D image, a first copied 3D image and a second copied 3D image are the same, and moreover, a second received 3D image, a third copied 3D image and a fourth copied 3D image have the same images. However, in FIG. 9, a first copied 3D image and a second copied 3D image differ, and a third copied 3D image and a fourth copied 3D image differ.

That is, in FIG. 9, a first copied 3D image and a second copied 3D image are generated by using a first received 3D image but at least one of them is newly generated by using a first received 3D image and a second received 3D image. Therefore, a first received 3D image and a second received 3D image have the different images. In the same manner, a third copied 3D image and a fourth copied 3D image, which are generated by using a second received 3D image, have different images.

For example, in a first received 3D image shown in the portion (a) of FIG. 9, an image of a circle is located in a center of a first pixel area of a first horizontal line and an image of a circle formed in a first copied 3D image (#1) generated from the first received 3D image is also located in a center of a first pixel area of a first horizontal line. However, an image of a circle formed in a second copied 3D image (#2) generated by using the first received 3D image and the second received 3D image is located in a right side of the first pixel area of a firs horizontal line. Also, in a second received 3D image shown in the portion (b) of FIG. 9, an image of a circle is located in a center of a second pixel area of a second horizontal line and an image of a circle formed in a fourth copied 3D image (#4) generated from the second received 3D image is located in a center of a second pixel area of a second horizontal line, too. However, an image of a circle formed in a third copied 3D image (#3) generated by using the first received 3D image and the second received 3D image is located in a left side of the second pixel area of a second horizontal line.

In the present invention, as shown in FIG. 9, the first copied 3D image (or the third copied 3D image) and the second copied 3D image (or the fourth copied 3D image) being generated to have different images is for more enhancing temporal resolution.

Figure 1:
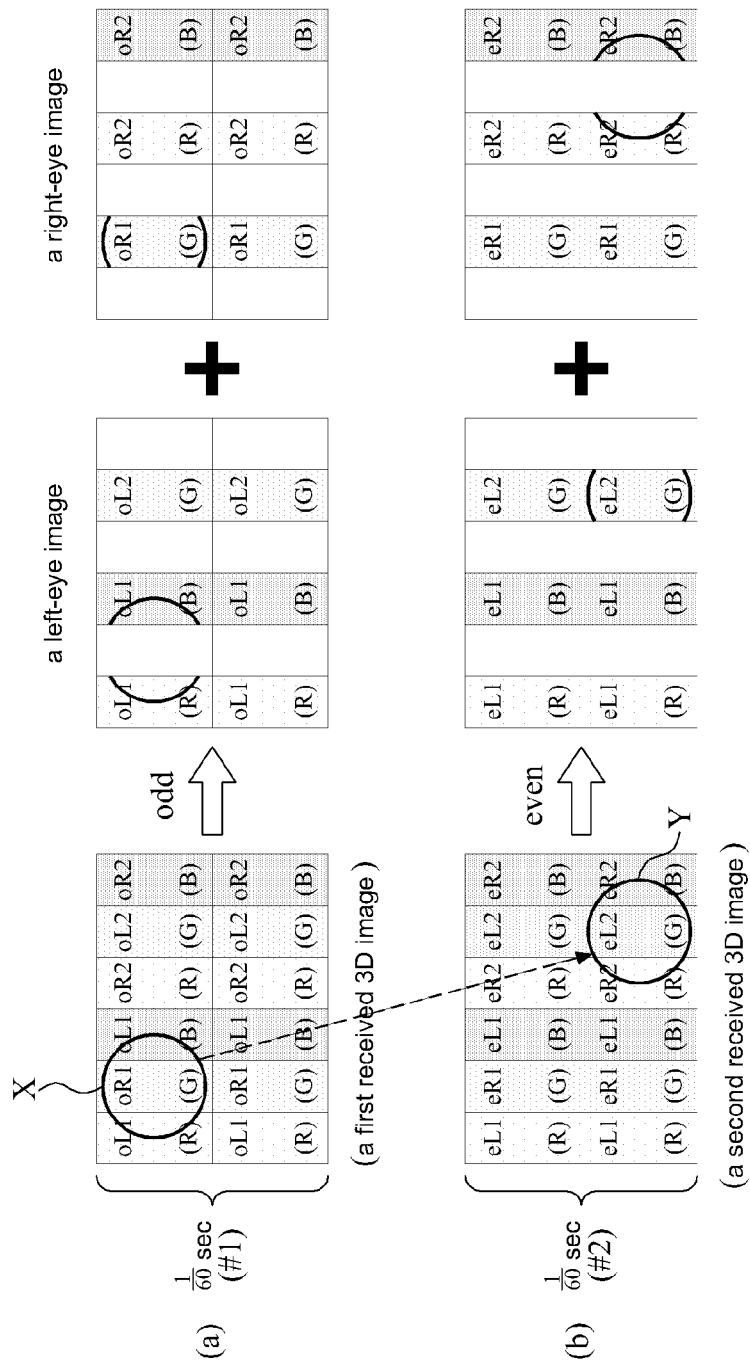
FIG. 1 is an exemplary diagram illustrating a configuration of a panel of a related art glasses-free 3D image display device using a fixed-filter type.
Figure 2:
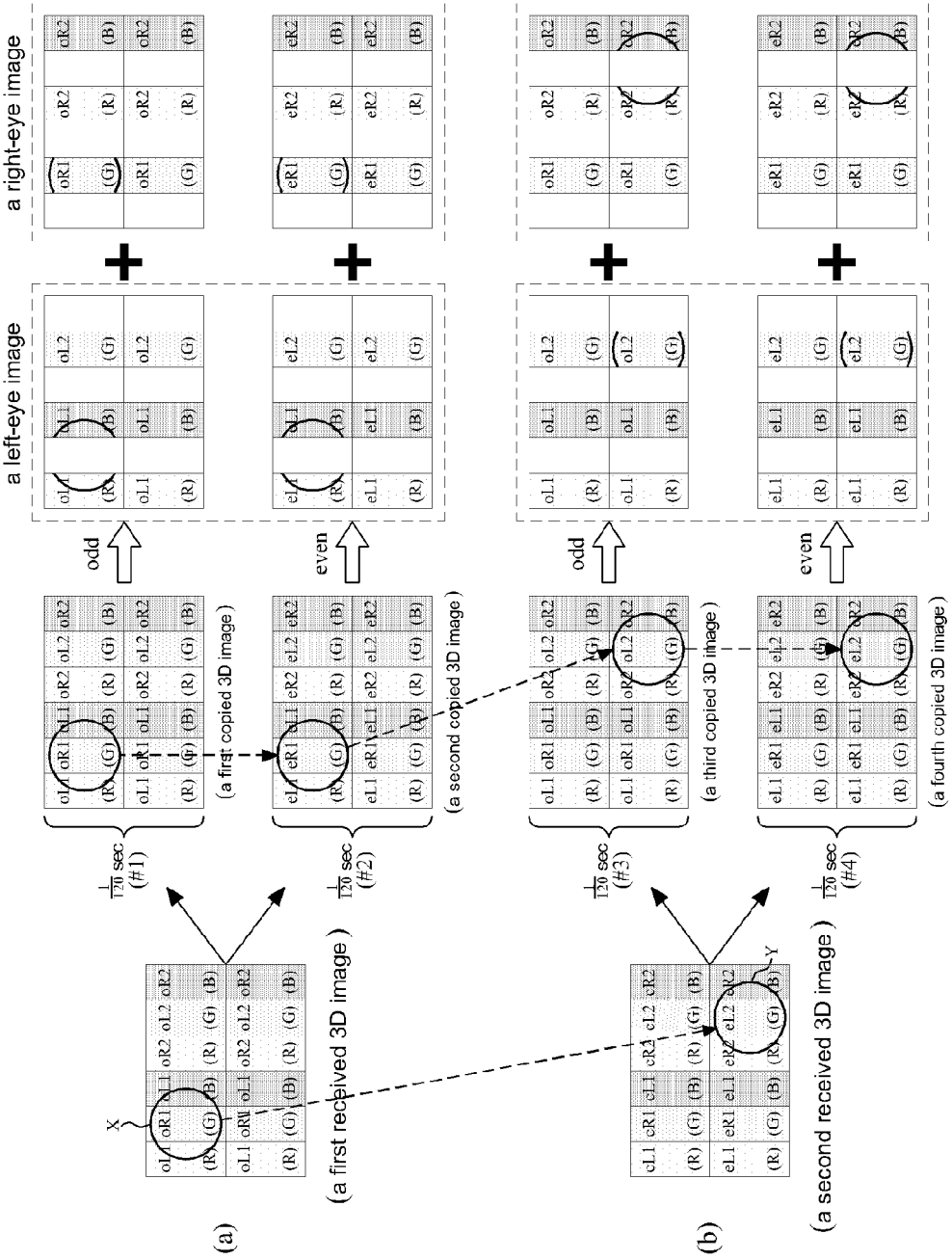

To provide an additional description, a moving image changed from the portion (a-1) of FIG. 8 to the portion (b-2) of FIG. 8 can be more naturally and clearly displayed for a user than a moving image changed from the first 3D image of FIG. 1 to the second 3D image of FIG. 2. Particularly, when a user watches a video changed from an image of a portion (a-1) of FIG. 9 to an image of a portion (b-2) of FIG. 9, a user can watch a much sharper picture much naturally because images between a first copied 3D image and a fourth copied 3D image are gradually changing.

Except the above-described description, a description on FIG. 8 is the same as that on FIG. 9.

That is, if one left-eye image shown in a portion (a-1) of FIG. 9 and the other left-eye image shown in a portion (a-2) of FIG. 9 are overlapped, all colors RGB are displayed and a circle is slightly moved to a right side. Therefore, according to the present invention, all colors may be completely transferred to each of a left eye and a right eye (full color), a sequentially changing image may be displayed (spatial resolution compensation) and because two frame is outputted for ⅟₆₀ sec equal to a time for which a first received 3D image is outputted, temporal resolution may be increased.

Likewise, the above-described feature of the present invention may be shown in the portions (b-1) and (b-2) of FIG. 9.

Therefore, the present invention using the method of FIG. 9 may display a full color, display a sequentially changing image, and increase temporal resolution.

Figure 10:
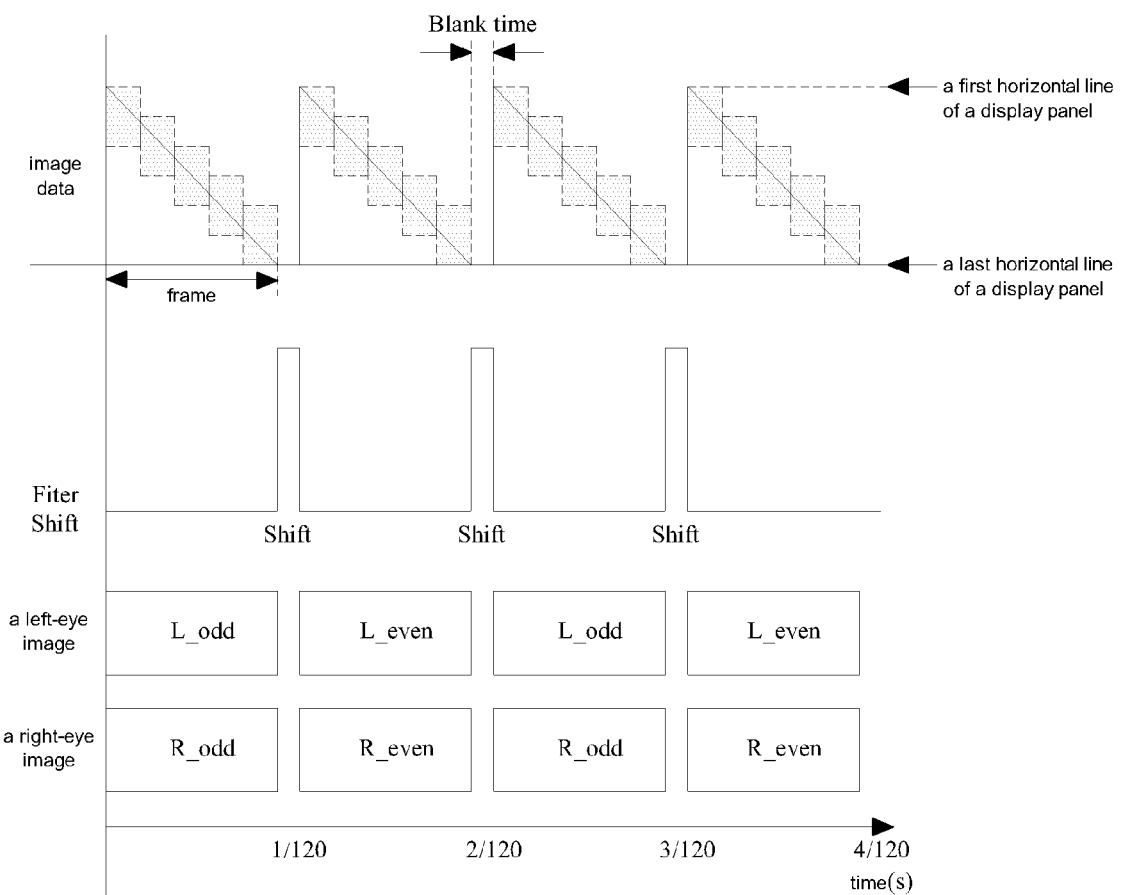
FIG. 10 is a timing diagram for describing shift of a filter in the 3D image display device according to the present invention and an exemplary diagram illustrating a scanning method of a backlight unit.

FIG. 10 is a timing diagram for describing shift of a filter in the 3D image display device according to the present invention and an exemplary diagram illustrating a scanning method of a backlight unit.

The 3D image display device according to the present invention uses a backlight unit 700 when a liquid crystal display panel is used as a panel 100.

In this case, in order to prevent image distortion that is caused when the position of a filter (lens cell or barrier) 500 is changed, the present invention turns on/off a backlight unit for a certain time.

For example, as shown in FIG. 10, a time for which image data is transferred from the first horizontal line of the panel 100 to the final horizontal line of panel 100 is one vertical period or one frame.

In this case, a filter 500 is shifted by a half view unit to a left side or a right side for a blank time between frames.

However, while a filter is shifted, an image is transferred to an eye of a user. Therefore, in order to prevent a distorted image from being transferred to an eye of a user while a filter is shifted, a light source of a backlight unit may be turned off in synchronization with a shift of a filter. For this end, a timing controller may transfer a backlight unit control signal to a backlight unit and a light source driver may turn off a light source in accordance with the backlight unit control signal transferred from a timing controller during a filter-shifting time, namely a blank time.

Also, the present invention may sequentially turn on/off a backlight unit in units of a horizontal line or in units of at least two or more horizontal lines. That is, among the diagrams shown in FIG. 10, in a diagram illustrating an image data, a dotted rectangle illustrates a state where a light source of a backlight unit is turn on/off in units of a horizontal line or in units of at least two or more horizontal lines.

Accordingly, a user can watch a sharp 3D image without flickers or blurring.

Here, the above-described two timings including a timing shifting a filter and a timing turning on/off a light source may be variously changed in accordance with a structure and characteristic of a cell configuring a filter 500, a characteristic of a light source configuring a backlight unit and a response characteristic of a display panel.

However, in a display device such as an organic light emitting diode display (OLED) which does not need a backlight unit, a panel itself may be turned on/off in accordance with a timing when a filter is shifted.

According to the embodiments, the present invention converts one received 3D image into at least one copied 3D image, outputs the copied 3D image in units of a frame, and changes a position of a slit through which an image is outputted in units of a frame, thereby outputting the image without the loss of color information and the decrease in spatial resolution and temporal resolution.

Moreover, the present invention can use a received 3D image, applied to a related art 3D image display device, as-is.

Moreover, the present invention repeatedly turns on and off the backlight unit, and thus can prevent image distortion that is caused when a lens or a barrier is switched on.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A three-dimensional (3D) image display device, comprising:
   a display panel outputting at least one image by using at least one copied 3D image;
   a filter disposed at a front surface of the display panel, and comprising a light transmitting area for transmitting the images and a light blocking area for blocking the images;
   a filter driver switching between a position of the light transmitting area and a position of the light blocking area; and
   a timing controller converting a received 3D image into the copied 3D image, outputting the copied 3D image through the display panel in units of a frame,
   wherein the timing controller converts the received 3D image into two copied 3D images which have the same images, and outputs a first copied 3D image of the two copied 3D images during a first frame and outputs a second copied 3D image of the two copied 3D images during a second frame through the display panel,
   wherein the timing controller controls the filter driver to switch between the position of the light transmitting area and the light blocking area in units of a frame,
   wherein a plurality of pixels configure one pixel area, the plurality of pixels including a first pixel and a second pixel, and the first pixel and the second pixel being immediately adjacent pixels,
   wherein the filter driver switches between the light transmitting area and the light blocking area, thereby allowing the first pixel, being an odd right-eye pixel during the first frame, to be an even left-eye pixel during the second frame and allowing the second pixel, being an odd left-eye image during the first frame, to be an even right-eye pixel during the second frame,
   wherein, during the first frame, an image from the odd right-eye pixel and an image from the odd left-eye pixel are transferred by the light transmitting area, and
   wherein, during the second frame, an image from the even left-eye pixel and an image from the even right-eye pixel are transferred by the light transmitting area.

2. The 3D image display device of claim 1, wherein,
   the timing controller generates the copied 3D image by using the received 3D image, and drives the copied 3D image at an output driving frequency to output the copied 3D image through the display panel, and
   the output driving frequency is a multiple of an input driving frequency at which the received 3D image is driven, and the multiple is equal to the number of the copied 3D image.

3. The 3D image display device of claim 1, further comprising a backlight unit irradiating light onto a liquid crystal panel when the display panel is the liquid crystal display panel,
   wherein the timing controller controls a light driver of the backlight unit such that a light source of the backlight unit does not emit light when the light transmitting area and the light blocking area are being switched in a disposed position.

4. A driving method of a three-dimensional (3D) image display device, the driving method comprising:
   converting a received 3D image into at least one copied 3D image; and
   outputting the copied 3D image through a display panel in units of a frame, and switching between a position of the light transmitting area and a position of the light blocking area in units of a frame, the light transmitting area and the light blocking area being formed in a filter disposed at a front surface of the display panel,
   wherein the switching of the position of the light transmitting area and the position of the light blocking area is performed for a blank time between frames, and the display panel does not output an image for the blank time,
   wherein a plurality of pixels configure one pixel area, the plurality of pixels including a first pixel and a second pixel, and the first pixel and the second pixel being immediately adjacent pixels,
   wherein the switching of the position of the light transmitting area and the position of the light blocking area allows the first pixel, being an odd right-eye pixel during the first frame, to be an even left-eye pixel during the second frame and allowing the second pixel, being an odd left-eye image during the first frame, to be an even right-eye pixel during the second frame,
   wherein, during the first frame, an image from the odd right-eye pixel and an image from the odd left-eye pixel are transferred by the light transmitting area, and
   wherein, during the second frame, an image from the even left-eye pixel and an image from the even right-eye pixel are transferred by the light transmitting area.

5. The driving method of claim 4, wherein,
   the outputting of the copied 3D image comprises driving the copied 3D image at an output driving frequency, and outputting the copied 3D image through the display panel, the copied 3D image being generated by using the received 3D image; and
   the output driving frequency is a multiple of an input driving frequency at which the received 3D image is driven, and the multiple is equal to the number of the copied 3D image.

6. The driving method of claim 5, wherein,
   the converting of a received 3D image comprises converting the received 3D image into two received 3D images having different images;
   the outputting of the copied 3D image comprises outputting a first copied 3D image of the two copied 3D images during a first frame through the display panel, and outputting a second copied 3D image of the two copied 3D images during a second frame through the display panel, and
   by switching between the light transmitting area and the light blocking area, a position of the light transmitting area in the second frame differs from a position of the light transmitting area in the first frame, and a position of the light blocking area in the second frame differs from a position of the light blocking area in the first frame.

* * * * *